United States Patent [19]

Däumer et al.

[11] 4,414,946

[45] Nov. 15, 1983

[54] CONTROL SYSTEM FOR AN OPERATING EVENT IN A VEHICULAR POWER TRAIN

[75] Inventors: Rolf Däumer, Weil der Stadt; Winfried Klötzner, Maulbronn; Manfred Schenk, Fellbach, all of Fed. Rep. of Germany

[73] Assignee: Robert Bosch GmbH, Stuttgart, Fed. Rep. of Germany

[21] Appl. No.: 326,507

[22] Filed: Dec. 2, 1981

[30] Foreign Application Priority Data

Jan. 14, 1981 [DE] Fed. Rep. of Germany ....... 3100825

[51] Int. Cl.[3] ...................... G06F 15/20; G05B 15/02; F02D 5/02

[52] U.S. Cl. .................................... 123/417; 123/414; 123/486; 123/416; 123/467

[58] Field of Search ............... 123/414, 417, 418, 480, 123/416, 424, 486, 487; 364/200, 424, 442, 900, 431

[56] References Cited

U.S. PATENT DOCUMENTS

| | | | |
|---|---|---|---|
| 4,178,893 | 12/1979 | Aoki | 123/416 |
| 4,244,339 | 1/1981 | Gorille | 123/416 |
| 4,250,858 | 2/1981 | Jeenicke et al. | 123/480 |
| 4,267,569 | 5/1981 | Baumann et al. | 123/417 |
| 4,304,256 | 5/1980 | Klotzner | 123/480 |
| 4,373,187 | 2/1983 | Isbii et al. | 123/480 |
| 4,603,539 | 12/1977 | Gorille et al. | 123/418 |

FOREIGN PATENT DOCUMENTS

| | | | |
|---|---|---|---|
| 2900111 | 7/1980 | Fed. Rep. of Germany | 123/418 |

*Primary Examiner*—Raymond A. Nelli
*Attorney, Agent, or Firm*—Frishauf, Holtz, Goodman & Woodward

[57] ABSTRACT

To reduce the data processing requirements within operating cycles of an automotive-type microprocessor or computer, the input/output unit has an angle increment counter receiving angle increment signals synchronized with rotation of the crankshaft of the engine, the counter providing output signals to comparators which, when the count state reaches predetermined values as applied from a data bus, derived from the microprocessor, to the comparator, then provides output signals to control the engine, for example by providing ignition control output signals, fuel injection control output signals, or the like. To further simplify computational tasks of the microprocessor, the input/output unit contains a timing element, for example a counter, which can provide variable timing intervals, for example by controlling the clock rate of the counter or a count number, under control of the data bus, and a transfer switch which selectively applies to a further counter either the signals from the timing circuit or from the crankshaft angle increment counter so that, as desired, data then being processed in the microprocessor can be selectively based on or compared with engine speed, or predetermined timing intervals, for consequential control of other operating parameters of the engine and the entire power train system of which it is a part.

10 Claims, 3 Drawing Figures

CONTROL SYSTEM FOR AN OPERATING EVENT IN A VEHICULAR POWER TRAIN

Reference to related patents, application and literature assigned to the assignee of this application:

U.S. Pat. No. 4,204,256, KLOTZNER.
U.S. Pat. No. 4,250,858, JEENICKE et al.
U.S. Pat. No. 4,063,539, GORILLE et al.
German Patent Disclosure Document DE-OS No. 29 00 111, JEENICKE et al.
Electronics, Jan. 20, 1977, page 102 et seq.
Electronic Design 1, Jan. 4, 1977, page 34 et seq.
Elektronik, 1977, issue 4, page 48 et seq.
SAE-Paper No. 750 432, Application of Microprocessors to the Automobile, page 65 et seq.
etz-b, vol. 28, 1976, issue 15, page 496 et seq.
Computer, August 1974, page 33 et seq.
RCA "User Manual for the CDP 1802 Cosmac Microprocessor MPM-201A"
RCA "Integrated Circuits, SSD-210, 4-76", the disclosure of the foregoing patents and literature being hereby incorporated by reference.

U.S. Ser. No. 326,509, filed Dec. 2, 1981, by the inventors hereof, "SIGNAL STEERING ARRANGEMENT IN AN AUTOMOTIVE-TYPE MICROPROCESSOR SYSTEM."

The present invention relates to controlling operating events in an automotive vehicular power train system, for example controlling the ignition instant in an internal combustion engine, that is, spark advance or retardation, fuel injection quantity and/or timing, providing signals when gear shifting to a higher or lower gear should be carried out, and/or control signals for an automatic transmission or the like, in which computer equipment is utilized to determine the output as function of operating conditions or the like of an automotive vehicle.

BACKGROUND

The referenced patents and literature describe various types of microprocessor controlled systems to monitor and furnish control signals for operating events in internal combustion engines, and particularly in internal combustion engines coupled to or forming part of a power train of a vehicle. Fixed wired computers to control operating events in an automotive vehicle, or in the internal combustion (IC) engine therefor, is described in the reference U.S. Pat. No. 4,063,539; fixed wired computers or signal processors have a disadvantage with respect to microprocessor control signals in that the computer is poorly adaptable to universal use since the system is designed for a particular engine and vehicle combination, and thus cannot be individually changed to fit various types of engines or models of vehicles with which the engine is to be used, and which all introduce different parameters which vary the respective outputs from the computer, although the basic computational methods may all be the same. Microprocessor systems have the advantage of being readily adaptable to different types of engines and power train systems. They are subject to improvement, however, since they are coupled to a multiplicity of input units and also output units, and thus must retain a substantial data base and hence memory locations, which are retained in fixed memories, for example read-only memories (ROMs). Comparatively complex programs are necessary to process externally applied signals by carrying out extensive, and hence slow computational steps. If the engine operates at high speed, the accuracy of signal processing by mathematical calculations suffers, unless the number of bits is increased and the cycling or clock time is made correspondingly high. To control, for example, a fuel injection system, more than eight bits are required for accurate computation although, usually, the microprocessors which are readily adaptable for automotive use operate with eight-bit words.

The referenced U.S. Pat. Nos. 4,204,256 and 4,250,858, as well as the German Disclosure Document DE-OS No. 29 00 111, describe microprocessor-input-/output combinations in which, to relieve the microprocessor of calculation tasks, the input/output units are so arranged that they themselves can carry out computational operations and counting. In such input-/output units, a problem similar to that of a wired program arises in that, for different types of IC engines, different parameters must be sensed; the type and number of parameters may depend on the engines and on the desires or design requirements of the engine manufacturer, and thus may require processing of different signals related to different engine parameters. Yet, to permit mass production of input/output units suitable for a number of different engines and, also, to permit interchangeability, it is desirable to provide input/output units which are applicable for various types of apparatus and engines, or engine-vehicle combinations, which, looked at from point of view of signal processing, means various types of power train systems.

The Invention

It is an object to facilitate calculating operations for a microcomputer or microprocessor, while permitting rapid access by the microprocessor to parameters necessary for its calculation, while providing for high variability in processing and handling of data representing the parameters.

Briefly, the microprocessor system includes a bus system for connection to input/output units to sense, respectively, operating parameters and provide respective signals, and to supply control signals for switching stages. The input/output unit includes an angle increment counter for periodic counting of numerical values supplied over a data bus, and to generate, upon establishing of a predetermined relationship with respect to input data—for example equivalence of counted numbers—output signal for application to the microprocessor. In accordance with the invention, a switch-over or transfer switch system is provided which provides alternative angle signals, and time interval signals derived from a timing unit, to the counter in the input/output unit.

In accordance with a preferred feature of the invention, a plurality of comparators are used to control the output switching stages, for example an ignition output stage. The comparators are associated with the angle increment counters deriving signals representative of rotation of the crankshaft of the IC engine—directly or indirectly. Counting sequences being carried out by the angle increment counters thus can be utilized for control of various parameters, that is, for example to control any respective desired number of output stages. This system, then, can be used in lieu of a high-tension ignition distributor with only minor additional apparatus requirement, thus avoiding the necessity of a mechanical distributor unit, and consequent difficulties associated therewith.

Synchronization, in accordance with a feature of the invention, of the periodic counting systems in the angle increment counter, can be obtained by associating a certain angle marker transducer, coupled to the crankshaft or the camshaft of the IC engine. The ignition cycle in a four-stroke IC engine requires 720° of crankshaft rotation. Thus, the crankshaft markers which can be accurately placed on the crankshaft can be utilized for synchronization; camshaft markers then are used to determine the initiation or beginning of a 720° cycle. A simple AND-function logic gate is then all that is needed to control the further signal processing.

The system has the advantage that the calculating operations which are concerned, essentially, with determining relationships between counting states, for example equality, and counting, sensing of measured values, and outputs of control signals are removed from the microprocessor and transferred to the input/output (I/O) unit. This substantially reduces the loading on the microprocessor and permits rapid access to parameters. The control of the particular relationship to be obtain can remain within the microprocessor. The system has a high degree of flexibility in regard to sensing and processing of parameter data. The changes can be controlled from the microprocessor. Thus, the system can be used with various types of engines, having different numbers and types of input/output signal requirements, and can be readily adapted to various types of engines and power train systems.

DRAWINGS

Figure 1:
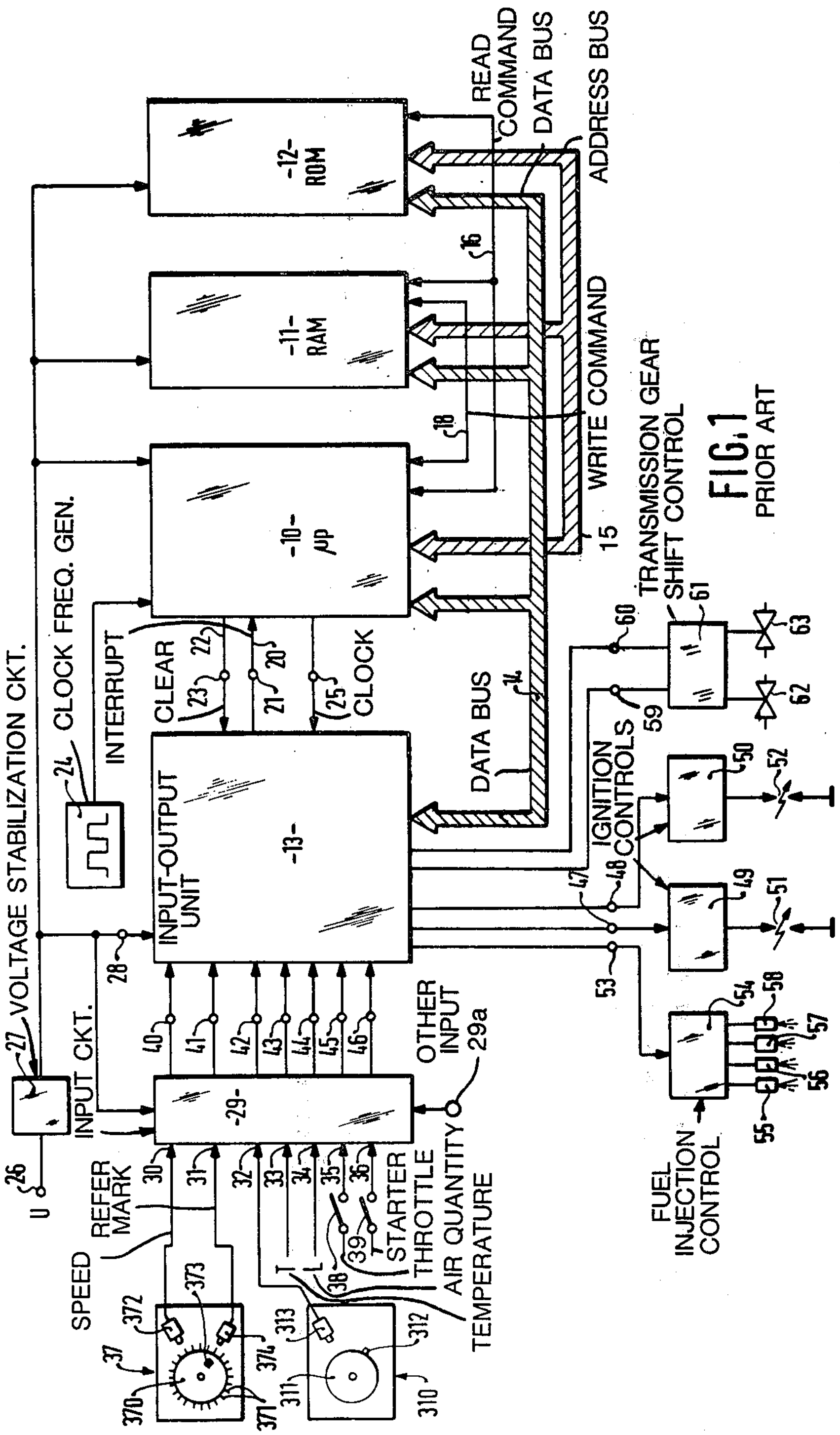
FIG. 1 PRIOR ART
FIG. 1 is a block diagram of a microprocessor system for an internal combustion engine, in accordance with the prior art.

FIG. 1 illustrates a microprocessor system in which a microprocessor 10 is connected to a random access or working memory (RAM) 11. Data which are fixed are stored in a ROM 12; for some uses, the ROM 12 may be an erasable programmable ROM, or merely a programmable ROM (EPROM; PROM). The system further includes an input/output unit 13. A data bus 14 connects the microprocessor 10, RAM 11, ROM 12, and the input/output (I/O) control unit 13. An address bus 15 connects the microprocessor 10, the RAM 11 and the ROM 12.

The data bus 14, for example, may be a bus having eight individual lines, in dependence on the number of bits to be transferred. An additional chip selection line may be necessary in order to select one or more elemental units within the I/O unit or stage 13. The microprocessor 10, RAM 11 and ROM 12 are connected by a read-command line 16 in order to control information flow which is applied or stored. A write-command line 18 is provided in order to read in or record information in the RAM 11. A program interrupt line 20 is provided, interconnecting the I/O unit 13 over terminal 21 with the microprocessor 10. This interrupt line is used in order to interrupt a program which is being run in the microprocessor if predetermined information is placed in the I/O unit 13. The microprocessor 10 has a "clear" command terminal 22, which is connected to the "clear" terminal 23 of the I/O unit 13. The clear command terminal 22 is connected to a suitable clearing stage in the microprocessor 10 which is provided to set predetermined initial conditions within the microprocessor 10, for example completely clear conditions, or the entry of information thereinto upon starting of a new program from either ROM 12 or RAM 11, and transfer of such conditions—if commanded—to the I/O unit 13. The condition, in the I/O unit 13 for example, may be a complete clearance of any data therein.

A frequency generator 24 is provided, furnishing clock signals for the microprocessor 10. The frequency derived therefrom is then, preferably, divided in suitable frequency dividing networks in the microprocessor 10 and connected to a terminal 25 forming the clock terminal of the I/O unit 13. Power supply is obtained from an external source providing a voltage U at terminal 26, which is connected to a voltage control or stabilization circuit 27 to provide stabilized output voltages at a terminal 28 which is connected to all elements containing electronic components. Only two such connections are shown for simplicity of the drawing.

The input/output unit is connected to an input circuit 29 which has seven inputs 30–36, each of which is connected to an external signal or data source. The external data sources provide signals to the input circuit 29, for processing by the I/O unit 13, which are representative of operating parameters or conditions of the power train system.

Inputs 30, 31 are connected to a transducer system 37 which has a star or gear disk 370 coupled to the crankshaft of the IC engine, and formed with a plurality of teeth 371 at its circumference. Rotation of these teeth is sensed by a first transducer 372. The teeth are ferromagnetic, the transducer is inductive, and change of flux within the transducer 372 causes a voltage signal to arise at the output terminal thereof. The signal sequence, which will be speed-dependent, is applied to the input of the input circuit 29. Rather than using ferromagnetic teeth, other systems may be used which can be scanned by a transducer, for example a disk may be made which is premagnetized in strips adjacent its circumference; or a disk with openings can be used which can be scanned optically. The disk 370 additionally carries a reference marker 373, which is scanned by a second transducer 374 to apply a referenced marker signal to the input 31.

A further transducer system 310 is provided, coupled to input 32. The transducer 310 has a disk 311 coupled to the camshaft of the IC engine, on which a reference marker 312 is applied. The reference marker 312 is scanned by a third transducer 313. Of course, the teeth 371 could also be applied to the disk 311, and scanned by the transducer 372. The frequency of the pulse sequence then, of course, would be half.

Further information regarding the operating conditions and ambient conditions of the IC engine or the vehicle, respectively, are: temperature T; quantity of air being admitted to the induction pipe of the engine L; position of the throttle switch 38; position of start switch 39. The temperature-air-throttle switch position and starter switch position are connected in the form of input signals applied to terminals 33–36 of the input circuit.

Other and additional information can be applied to the input circuit, and the type of information parameters described herein is not limited to those listed; for example, additional inputs can be applied in the form of:

level of unstabilized supply voltage U;

output signals from an engine knock sensor;

output signals from an exhaust gas composition sensor;
pressure within the induction manifold;
output torque delivered by the engine;
output signals representative of engaged gearing;
and such other further information signals as may be required.

Collectively, all these further signals are indicated by a single input, schematically shown by arrow 29*a*, connected to input circuit 29.

All the input signals, that is, the seven input signals—which, preferably, form the minimum number—as well as additional input signals at terminal 29*a* are processed in the input circuit 29 to remove noise and spurious signals therefrom, for example by filtering and, if provided in analog form, to convert the signals into digital form by suitable analog/digital converters. A suitable analog/digital converter uses a voltage controlled oscillator (VCO) for transforming analog information into digital or frequency-type information. Signal processing, noise suppression and the like, may utilize, for example, Schmitt trigger circuits. Additionally, contact-bounce suppression circuits, circuits to prevent over-voltages, protective circuits with respect to over-voltages, short circuits and the like, may also be used, as well known.

The input/output unit 13 is connected to switching output stages 49, 50 over output terminals 47, 48. The output stages 49, 50 are ignition stages which, as is customary, include a semiconductor switch, such as a transistor, in the primary circuit of an ignition coil. The secondary circuit includes at least one spark plug or spark gap 51, 52, respectively. A further output circuit 54 is provided to control fuel injection to inject fuel, for example, gasoline, by four injection nozzles 55–58. The fuel injection output terminal 53, connected to I/O unit 13, provides the control pulses to the fuel injection unit 54. An additional output control unit 61 is illustrated which is connected to terminals 59, 60 of the I/O unit 13, and is utilized to control transmission shifting by selectively energizing or de-energizing hydraulic valves 62, 63. Various other output elements may be used.

The system is described with respect to a four-cylinder engine; two ignition control systems 49, 50 are shown, and each one of the spark gaps 51, 52 represents two spark plugs, in different cylinders. The spark plugs can spark or flash over in unison; one of the spark plugs sparks at the required ignition instant, which will be before the respective piston has reached top-dead-center (TDC) position, compressing the fuel-air mixture in the respective cylinder. The other spark plug, which also flashes over, will not cause any ignition event, since, at that time, the exhaust valve from the respective other cylinder will be open and the spark will, ineffectively, occur while burned combustion gases are being exhausted.

Basic Operation: The above referenced literature has described the general operation of the system; the handbooks issued by manufacturers of microprocessors and associated apparatus are also referred to, in which the construction and circuit connection of the components are described in detail; operation and programming, likewise, is described therein, as well as variations in constructions and various connection possibilities. The referenced RCA manuals are particularly instructive.

The program stored in the ROM 12 is processed in the microprocessor 10 with respect to the information derived from the input circuit 29 and applied by the input/output unit 13. The computed result, in the present case signals to control ignition, fuel injection, and gear shifting, is then transmitted to the output stages 49, 50, 54, 61 to carry out the desired switching commands, and effect the respective output actions. Final results and intermediate results can be stored in the RAM 11 for possible recall by the microprocessor 10.

The number of microprocessors used, of ROMs and RAMs, is not limited to that shown in the figure and specifically described; it may be expanded in dependence on information which is to be processed, the scope of the program, and the scope of the data which are to be stored, and/or to be processed. The number of microprocessors, and storage locations in the RAM 11 as well as in the ROM 12, will depend on the constructional type of the system, and the possibility of long-time memory as well as short-time memory and buffer storage, and the availability of respective storage locations.

Figure 2:
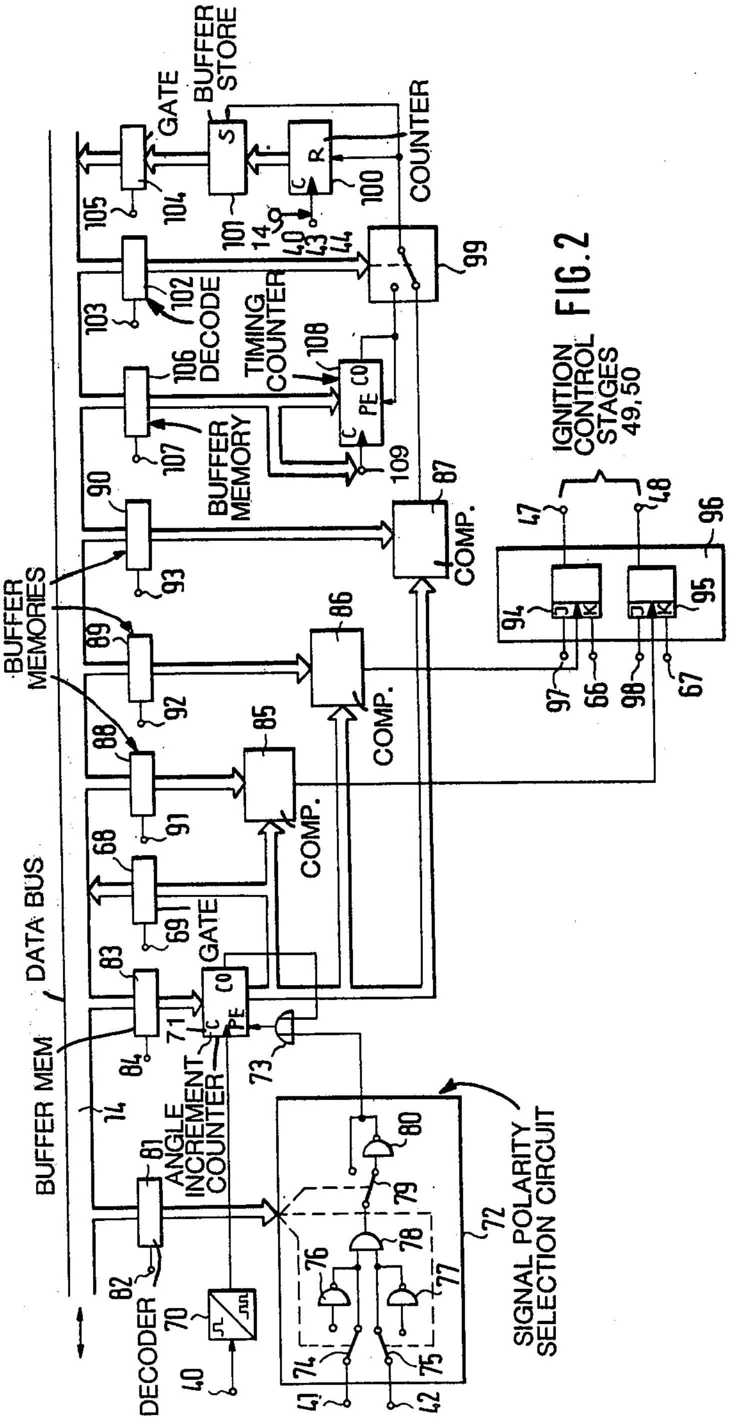
FIG. 2 is a block diagram of an input/output unit in accordance with the present invention.

FIG. 2 illustrates a portion of the input/output unit 13, arranged in accordance with the present invention. Terminal 40—see also FIG. 1—has a pulse-type speed signal applied thereto. Terminal 40 is connected to a frequency multiplying stage 70 which, in turn, is connected to the clock input C of a crankshaft angle increment counter 71. Terminals 41, 42—see also FIG. 1—carrying reference marker signals are connected over a selection input circuit 72, the output of which is connected to an OR-gate 73 which is connected to the loading pulse input PE of the counter 71. The two terminals 41, 42 in the selection circuit 72 are selectively connectable by transfer switches 74, 75 either directly or over an inverter 76, 77, respectively, to an AND-gate 78. The output from the AND-gate 78 is selectively connectable over a further switch 79 directly or over an inverter 80 to the OR-gate 73. The transfer switches 74, 75, 79 may be formed, for example, by transmission gates and are controlled from the data bus 14 through a transfer switch decoding stage 81. The decoding stage 81 has a control input 82.

The overflow output CO of the counter 71 is connected to the other input of the OR-gate 73. A buffer memory 83 is connected to the data bus 14. The buffer memory 83 has an entry or transfer control terminal 84. The count inputs of the counter 71 are connected to count comparison inputs of three comparators 85, 86, 87. Comparison count inputs of the comparators 85, 86, 87 are connected through buffer storage or memories 88, 89, 90 which, respectively, are controlled by signals at terminals 91, 92, 93, the buffer memories being connected to the data bus 14. The count outputs of the counter 71 are connected through a gate 68, which has a control terminal 69, to the data bus 14.

The outputs of the comparators 85, 86 control, respectively, each a JK flip-flip (FF) 94, 95 which form the output stage control elements for the ignition control unit 49, 50. The J inputs and the K inputs of the FFs 94, 95 are connected to control terminals 97, 98 and 66, 67, respectively.

In accordance with a feature of the invention, a transfer switch 99 is provided, having one terminal connected to the output of the comparator 87, and the other to a timing element 108 formed by a counter. The transfer switch 99 has its switching element connected to the reset input R of a counter 100 as well as to the SET input of a buffer store 101. Transfer switching of the switch 99 is controlled from the data bus 14 over a transfer switch decoding stage 102. The decoding stage 102 is controlled from a control terminal 103. The count outputs of the counter 100 are connected to the count inputs of the buffer store 101. The count outputs of the buffer store 101 are connected over a gate 104, which has a control terminal 105, to the data bus 14. The clock input C of the counter 100 can be selectively connected, under control of the data bus, with terminals 40, 43 or 44 (FIG. 1) or other parameter-dependent counting frequencies. The data bus 14 is additionally connected over a buffer memory 106, which has a control terminal 107, with the count inputs of the timing counter 108. The clock input C of the counter 108 is connected over terminal 109 with a counting clock frequency. Various clock frequencies could be connected to the terminal 109, under control of data derived from the data bus 14, for example under control of a further decoding circuit. Reference is made to the U.S. Pat. Nos. 4,250,858 and 4,204,256, as well as to the DE-OS No. 29 00 111, for further details of control of the timing counter 108. The counter overflow terminal CO of the counter 108 is connected with the SET input PE thereof and, additionally, or alternatively, can be connected to the output of the comparator 87 by the transfer switch 99 with the RESET input of the counter 100 in dependence on the position of the switch 99.

The control terminals 66, 67, 82, 84, 91, 92, 93, 97, 98, 103, 105, 107 receive control signals through a decoding device—not shown—as described in the aforementioned referenced patents and German Disclosure Document to determine the sequencing of the control signals in dependence on the program which is run in the microprocessor. Reference is also made to the literature, and particularly the manufacturer's literature how sequencing control signals can be derived from a microprocessor in which a program is being run, and in which the control signals depend on the state of respective program conditions.

Figure 3:
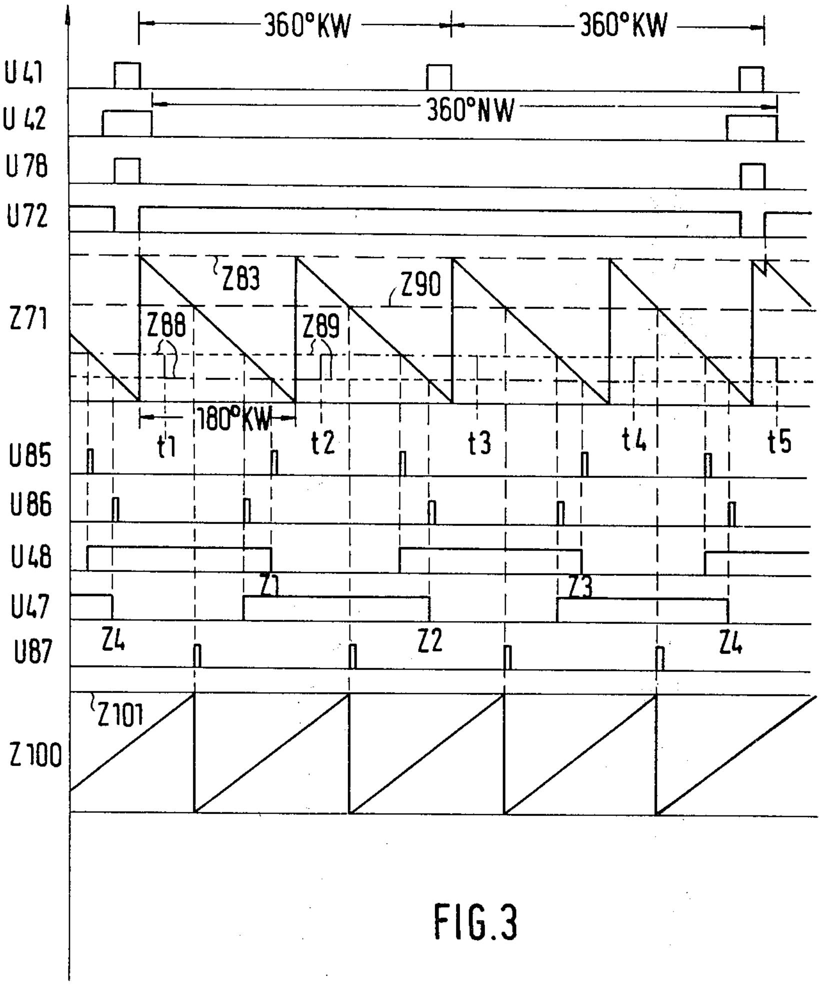
FIG. 3 is a sequence of timing graphs used to explain the operation of the system and the method in accordance with the invention.

Operation, with reference to FIG. 3: The crankshaft angle increment counter 71 is set to the numerical value V83 stored in the buffer memory 83 when a signal is derived from the selection circuit 72 each time after two full rotations of the crankshaft, that is, after 720° rotation thereof. Upon being set to the value Z83, the counter counts down in the rhythm of the angle increments as determined by the teeth 371, transduced by transducer 372, and available at the terminal 40 (FIG. 2). When the counter has reached the value null or zero, an overflow signal at the counter overflow terminal CO thereof or a signal from the OR-gate 73 resets the counter back to the count number Z83, and starts anew to count down. The count number Z83 is so set that the angle increment counter 71 will have that number of count cycles occur therein which corresponds to the numbers of cylinders of the IC engine within a range of 720° of rotation of the crankshaft. This is effective for all four-stroke IC engines. The illustrated example refers to a four-cylinder IC engine. Synchronization is effected after each 720° of crankshaft rotation by the selection circuit 72, that is, if for example due to malfunction, interference, noise or disturbance pulses, an error should have occurred, the error will be eliminated after each 720° rotation of the crankshaft. This is illustrated in the first cycle of FIG. 3. The arrangement is used to generate an internal or electronic reference marker or reference marker signal. Since the marker 373 coupled to the disk 370 (FIG. 1) connected to the crankshaft of the engine due to the higher speed provides more precise signals U41, and this marker occurs at each 360° of crankshaft rotation, the marker 312 on the camshaft is utilized in order to determine the 720° range of crankshaft rotation. Markers 373 and 312 are so arranged that generation of a signal U42, from marker 312, also causes generation of a signal U41 from marker 373. The signal U42 is longer. Upon simultaneous occurrence of signals U41 and U42, the output of the AND-gate 78 provides a synchronizing signal U78, which characterizes the beginning of a new crankshaft revolution cycle of 720°—two revolutions.

The inversion possibilities in the selection circuit 72 are utilized to match the system to various types of transducers 37, 310. If, for example, the signal U41 would be generated as a negative signal, then the transfer switch 74—under program control—is changed over, so that the signal can be inverted by inverter 76. Similar considerations apply to the signal U42. Inverter 79 is used to determine that flank of the signal U41 at which the counter 71 should be set. In the present example, counter 71 is set with a positive flank, and this setting should occur at the second flank of the signal U41. Thus, inverter 80 must be used in order to invert the signal U78. If the counter 71 is to be set by the first flank of the signal U41, transfer switch 79 must be changed over. The selection circuit 72, thus, through the program of the microprocessor, can be utilized to match the system to any type of transducer system, by entering respectively appropriate code words into the decoding stage 81. Circuit 72, thus, functions as a signal polarity selection circuit under control of decoder 81.

The ignition output control stages 49, 50, connected to terminals 47, 48, are controlled by the comparators 85, 86. Similarly, the output stages 54 for fuel injection, and 61 for gear shifting or transmission changes can be controlled by similar comparators. Numerical values Z88, Z89—FIG. 3—are determined in the microprocessor, in dependence on the parameters to be sensed, and applied over the data bus 14 to the buffer memories 88, 89. Storage is controlled by control signals applied to the respective terminals 91, 92. The value of the number Z88, Z89 is changed at the time instants T1 to T5 in order to provide data characterizing the beginning and the end of the closing time of the ignition switch controlling current flow through an ignition coil, and contained within the stages 49, 50. FIG. 3 illustrates the value Z88 as a chain-dotted line, and the numerical value Z89 as a dotted line.

Upon equality of the applied numerical values, comparators 85, 86 provide output pulses U85, U86 which cause the state of the JK-FFs 94, 95 to change in dependence on the control signals applied to the respective terminals 66, 67, 97, 98. The output signals U47, U48 determine the closing time or dwell time of the ignition output stages 49, 50. Signal U47 is applied to the ignition system associated with cylinders two and four of the four-cylinder engine, and signal U48 controls the ignition system associated with cylinders one and three. The ignition instants, controlling generation of the spark at the respective spark plug, are indicated by the designation Z1, Z2, Z3, Z4. In known manner, the spark plugs of cylinders one and three on the one hand, and of cylinders two and four on the other, are simultaneously energized to have an ignition spark flash over. This ignition spark will ignite the air-fuel mixture in the closed cylinder, which is just about to change from the compression stroke to the power stroke, and will be ineffective with respect to the burned combustion exhaust gases of the other cylinder; in other words, the ignition spark will occur in an ambient surrounding which, in one cylinder, contains an ignitable mixture, and in the other cylinder contains exhaust gases. The control signals on the terminals 66, 67, 97, 98 are applied at uniform intervals between two closing time periods, that is, in the FF 94 for example at the time instants $t_1$, $t_3$, $t_5$, etc. This permits setting an extinction determined by the program, in which the time instants are determined by the output signals from comparators 85, 86. Further possibilities of invasion of the system, resulting in instantaneous setting and extinction, can be obtained by the program, for example by direct setting and resetting inputs having higher priority. The system described permits use of a single counter 71 which is computer controlled to then in turn control a plurality of output stages while avoiding the necessity of a mechanical high-voltage distributor, permitting, further, overlap of closing times. A specific association of cylinders to the computer is not needed since this is obtained within the I/O circuit 13.

The number of the output stages controlled in this manner by a suitable number of comparators, of course, is not limited to two output stages, but can be expanded as desired; even a larger number of comparators can readily be controlled by the counter 71 which is the only counter needed to generate the respective trigger signals.

The comparator 78 is used to generate rotary angle intervals during which sequences of signals which depend on operating parameters are to be processed. In the present example, that is, of a four-cylinder IC engine, the intervals are 180° intervals. These intervals can be changed, as desired, under computer control, if different numerical values Z90 are applied through the buffer memory 90 from the data bus 14. The angle signals U87—FIG. 3—generated in the comparator 87 are used in the counter 100 as reset signals which, each time, start a new count cycle in the counter 100. During any such count cycle, a parameter-dependent frequency is counted, for example the quantity of air induced through the induction pipe of the engine, as represented by a pulse signal of frequency dependent on the air quantity. The count state Z101 is transferred, shortly before reset, into the buffer store 101 and, as needed, can be interrogated by the microprocessor 10 by applying an interrogation control signal to the gate control terminal 105, and then interrogating the buffer store 101 through gate 104. Thus, a signal which has been derived from the counted frequency corresponding to air quantity, counted during an angular interval, can be obtained which is directly representative of fuel injection time.

Other frequencies depending on operating or ambient parameters, for example speed-dependent frequencies or temperature-dependent frequencies have to be counted during an angular interval corresponding to a fixed time interval. In this case, the decoding stage 102 causes change-over of the transfer switch 99 so that the time interval to limit the counting cycle of the counter 100 is determined by the timing counter 108. This time interval can be varied by applying either different counting values to the timing counter 108 over buffer memory 106 as controlled by control terminal 107 or by changing the counting frequency at the terminal 109. In dependence on the count number provided by the buffer memory 106, or the count rate as determined by input 109, a reset signal for the counter 100 is generated by the timing element formed by counter 108.

The system is highly flexible, since different parameters derived, for example, from the terminals 40, 43, 44, can be counted in a single counter 100 either to (a) during a variable crankshaft angle interval—as determined by comparator 87, or (b) during a variable time interval, as determined by a timing element, formed by timing counter 108.

The count result derived from counter 100 is then stored in the buffer store 101, for interrogation when required. The I/O unit 13 thus is rendered much more versatile and variable with respect to sensing of parameters, and can readily be adapted to different types of IC engines, in different types of power train systems for various types of vehicles, as required, for example, by variable demands of different automotive manufacturers.

The respective count states of the counters, as well as the operating states of the output stages, can of course be interrogated by suitable control signals applied for example over the data bus 14—see, for example, the referenced U.S. Pat. Nos. 4,204,256, 4,250,858 and the German Disclosure Document DE-OS No. 29 00 111. Such interrogation is shown in the present application only for the counter 100 and for the counter 71, by gates 104 for counter 100, and 68 for counter 71, respectively.

Various changes and modifications may be made within the scope of the inventive concept.

We claim:

1. For combination with a vehicular power train, a control system to control an operating event within said power train and having a rotating shaft, said control system having a microprocessor unit (10);

an input/output (I/O) unit (13);

a data bus system (10) interconnecting the microprocessor unit and the input/output unit;

a plurality of input sensor elements (**37, 310, 372, 374, 313, T, L, 38, 39, 29*a*) providing sensing signals representative of operating parameters of the power train, connected to and providing said sensing signals to the input/output unit, one of said input sensor elements (370, 372) forming a crankshaft angle increment transducer (37**) providing a train of crankshaft increment signals;

a plurality of output stages (49, 50, 54, 61) for carrying out operating commands connected to and controlled by the input/output unit;

a crankshaft angle increment counter (71) connected to receive said crankshaft angle increment signal train and counting the pulses of said pulse train at a rate determined by the frequency of said pulse train;

a first comparator (83) connected to the angle increment counter and to the data bus to receive a comparison signal from the data bus (14) and providing a first output signal when the count output from said angle increment counter (71) and from the data bus have a predetermined relationship, said output signal being connected to at least one of the output stages to control operation thereof;

a second comparator (87) connected to the angle increment counter (71) and to the data bus (14) to receive a comparison signal from the data bus and providing a second output signal when the count output from the angle increment counter and from the data bus have a second predetermined relationship;

a second counter (100) having its output connected to the data bus (14) to provide output signals thereto for processing in the microprocessor unit (10) in accordance with a selected parameter or value, as determined by the signal applied to the second comparator (87) from the data bus, and comprising, in accordance with the invention, a timing circuit (108) providing timing signals;

and transfer switch means (99) having its switching state controlled by data from the data bus (14) and transferring to the second counter (100), selectively, and in accordance with the switching state thereof, (a) the output signals from said second comparator (87), or (b) the timing signals from the timing circuit (108), to control the counting cycle of the second counter (100) selectively by (a) the parameter-dependent pulse train derived from the second comparator (87), as counted by said angle increment counter (71), or (b) the timing interval of the timing circuit (108), and wherein the angle increment counter (71), the second counter (100), said first and second comparators (85, 87) and the timing circuit (108) form part of the input/output unit, to permit the input/output unit to provide data to the data bus, and hence to the microprocessor, selectively, based on signals processed by a single shaft angle increment counter (71) or, selectively, based on time intervals determined by said timing circuit (108).

2. System according to claim 1, wherein the timing circuit (108) is a counter connected to and controlled by the data bus (14), said data bus providing data to said counter controlling at least one of: counting rate; count number.

3. System according to claim 1, further comprising at least one additional comparator (86) connected to the angle increment counter and to the data bus to receive a comparison signal from the data bus (14), and providing an additional output signal when the count output from the angle increment counter (71) and from the data bus have an additional predetermined relationship, the output signal from the additional comparator being connected to at least a further one of the output stages (50, 54, 61) to control the operation thereof.

4. System according to claim 1, wherein the power train includes a camshaft;

said input sensor elements include a camshaft angle transducer (310);

and a selection circuit (72) is provided, receiving both said crankshaft angle signal pulse train and said camshaft angle signal pulse train, said selection circuit includes an AND-function circuit (78) providing a synchronization signal, said synchronization signal being connected to and synchronizing the angle increment counter (71).

5. System according to claim 4, wherein the camshaft angle transducer provides output signals in pulse form having a greater pulse width than the output signals derived from the crankshaft angle increment transducer, the AND-function circuit providing said synchronization signal when there is overlap between the respectively applied signals.

6. System according to claim 4, wherein the selection circuit (72) further includes selectively connectable direct and inverting inputs, and controlled transfer switch means (74, 75, 79) controlled by data from said data bus (14) to, selectively, connect direct or inverting inputs to the respective transducers and, selectively, to the crankshaft angle increment counter for matching of polarity of signals supplied by respectively different types of transducers connectable in said system.

7. For combination with a vehicular power train, a control system to control an operating event within said power train, said power train having an engine including a crankshaft and a camshaft;

said control system having an input sensor element (370, 372) coupled to the crankshaft of the engine and forming a crankshaft angle increment transducer (37) providing a train of crankshaft increment signals;

a crankshaft angle increment counter (71) connected to receive said crankshaft angle increment signal train and counting the pulses of said pulse train at a rate determined by the frequency of said pulse train;

a reference marker (373) and reference marker transducing means (374) coupled to said crankshaft and providing a marker signal representative of a predetermined angular position of said crankshaft;

a camshaft angle transducer (310) coupled to the camshaft of the engine and operating at a speed different from said crankshaft;

and a selection circuit (72) receiving at least one of said crankshaft signals and said camshaft angle signals, said selection circuit including an AND-function circuit (78) providing a synchronization signal, said synchronization signal being connected to and synchronizing the angle increment counter (71).

8. System according to claim 7, wherein the camshaft angle transducer provides output signals in pulse form having a greater pulse width than the output signals derived from the crankshaft angle increment transducer, the AND-function circuit providing said synchronization signal when there is overlap between the respectively applied signals.

9. System according to claim 7, wherein the selection circuit (72) further includes selectively connectable direct and inverting inputs, and controlled transfer switch means (74, 75, 79) controlled by data from said data bus (14) to, selectively, connect direct or inverting inputs to the respective transducers and, selectively, to the crankshaft angle increment counter for matching of polarity of signals supplied by respectively different types of transducers connectable in said system.

10. System according to claim 7, wherein the marker on the camshaft rotates through 720° of crankshaft angle rotation to provide positive association of counting events with respect to the strokes of a four-stroke engine regardless of spurious or interference or noise pulses.

* * * * *